United States Patent
Jang et al.

(10) Patent No.: US 12,024,535 B2
(45) Date of Patent: Jul. 2, 2024

(54) ORGANOSILICON COMPOUND, METHOD FOR PRODUCING THEREOF, AND USE THEREOF

(71) Applicants: DOW TORAY CO., LTD., Tokyo (JP); DOW GLOBAL TECHNOLOGIES LLC, Midland, MI (US)

(72) Inventors: Eun Sil Jang, Midland, MI (US); Takuya Ogawa, Tokyo (JP); Tadashi Okawa, Tokyo (JP)

(73) Assignees: DOW TORAY CO., LTD., Tokyo (JP); DOW GLOBAL TECHNOLOGIES LLC, Midland, MI (US)

( * ) Notice: Subject to any disclaimer, the term of this patent is extended or adjusted under 35 U.S.C. 154(b) by 657 days.

(21) Appl. No.: 17/281,661

(22) PCT Filed: Sep. 26, 2019

(86) PCT No.: PCT/US2019/053146
§ 371 (c)(1),
(2) Date: Mar. 31, 2021

(87) PCT Pub. No.: WO2020/072269
PCT Pub. Date: Apr. 9, 2020

(65) Prior Publication Data
US 2022/0017547 A1   Jan. 20, 2022

(51) Int. Cl.
*C07F 9/32* (2006.01)

(52) U.S. Cl.
CPC .................. *C07F 9/3264* (2013.01)

(58) Field of Classification Search
CPC ......... C07F 9/3264; C07F 9/304; C08G 77/14
See application file for complete search history.

(56) References Cited

U.S. PATENT DOCUMENTS

| | | | |
|---|---|---|---|
| 4,337,348 | A | 6/1982 | Takamizawa et al. |
| 4,391,963 | A | 7/1983 | Shirahata |
| 4,467,082 | A | 8/1984 | Shirahata et al. |
| 4,477,326 | A | 10/1984 | Lin |
| 4,534,838 | A | 8/1985 | Lin et al. |
| 4,935,455 | A | 6/1990 | Huy et al. |
| 4,946,874 | A | 8/1990 | Lee et al. |
| 4,952,711 | A | 8/1990 | Jacobine et al. |
| 5,158,988 | A | 10/1992 | Kurita et al. |
| 5,210,110 | A | 5/1993 | Rutsch et al. |
| 5,776,658 | A | 7/1998 | Niesert et al. |
| 6,689,442 | B2 | 2/2004 | Nakamura et al. |
| 10,597,413 | B2 | 3/2020 | Tan et al. |
| 2001/0031898 | A1 | 10/2001 | Wolf et al. |
| 2001/0036978 | A1 | 11/2001 | Kohler et al. |
| 2002/0026049 | A1 | 2/2002 | Wolf et al. |
| 2012/0142805 | A1 | 6/2012 | Grutzmacher et al. |
| 2016/0039851 | A1* | 2/2016 | Müller ............... C07F 9/34 |
| | | | 522/63 |
| 2019/0233670 | A1 | 8/2019 | Matsumoto et al. |
| 2019/0359874 | A1 | 11/2019 | Kitazawa |
| 2020/0032111 | A1 | 1/2020 | Ogawa et al. |
| 2022/0002546 | A1 | 1/2022 | Jang et al. |

FOREIGN PATENT DOCUMENTS

| | | |
|---|---|---|
| CN | 103333276 A * | 10/2013 |
| CN | 103333276 A | 10/2013 |
| JP | S57009792 A | 1/1982 |
| JP | S57131230 A | 8/1982 |
| JP | H04316588 A | 11/1992 |
| JP | 2000169511 A | 6/2000 |
| JP | 2011195719 A | 10/2011 |
| JP | 2020531594 A | 11/2020 |
| WO | 2017120743 A1 | 7/2017 |
| WO | 2017155919 A1 | 9/2017 |
| WO | 2018003381 A1 | 1/2018 |
| WO | 2018066379 A1 | 4/2018 |
| WO | 2018151033 A1 | 8/2018 |
| WO | 2019037016 A1 | 2/2019 |
| WO | 2020072270 A1 | 4/2020 |

OTHER PUBLICATIONS

Sauer, R. O. 21(6), Journal of Chemical Education, 303-305. (1944) (Year: 1944).*
Machine assisted English translation of JP2011195719A obtained from https://worldwide.espacenet.com/patent on Jun. 6, 2023, 9 pages.
Machine assisted English translation of JPS57131230A obtained from https://worldwide.espacenet.com/patent on Dec. 6, 2023, 8 pages.
International Search Report for PCT/US2019/053146 dated Jan. 14, 2020, 5 pages.
Machine assisted English translation of CN103333276A obtained from https://patents.google.com/patent on Mar. 30, 2021, 7 pages.
Eibel, A. et al., "Extending the Scope of Bis(acyl)phosphane Oxides: Additional Derivatives", Eur. J. Inorg. Chem., 2017, vol. 18, pp. 2469-2478.

* cited by examiner

*Primary Examiner* — Alexander R Pagano
*Assistant Examiner* — Frank S. Hou
(74) *Attorney, Agent, or Firm* — WARNER NORCROSS + JUDD LLP

(57) ABSTRACT

An organosilicon compound having not more than 200 silicon atoms per molecule is provided. The organosilicon compound is represented by the following average compositional formula (I): $Y_a R^1_b SiO_{(4-a-b)/2}$ wherein $R^1$ is an alkyl group having 1 to 12 carbon atoms, alkenyl group having 2 to 12 carbon atoms, aryl group having 6 to 20 carbon atoms, alkoxy group having 1 to 6 carbon atoms, or a hydroxyl group; Y is a specific acylphosphinate residue; and subscripts a and b are numbers satisfying the following conditions: $0 < a \leq 2$, $0 < b \leq 3$, and $a \leq b$. The organosilicon compound is compatible with organopolysiloxanes and is useful as a photo-initiator for various types of photo-curable compositions.

7 Claims, No Drawings

ORGANOSILICON COMPOUND, METHOD FOR PRODUCING THEREOF, AND USE THEREOF

CROSS-REFERENCE TO RELATED APPLICATIONS

This application is the U.S. National Stage of International Application No. PCT/US2019/053146 filed on 26 Sep. 2019, which claims priority to and all advantages of U.S. Provisional Patent Application No. 62/739,473 filed on 1 Oct. 2018, the content of which is incorporated herein by reference.

TECHNICAL FIELD

The present invention relates to a novel organosilicon compound having at least one acylphosphinate residue per molecule, a method for producing thereof, and a use thereof as a photo-initiator.

BACKGROUND ART

In order to improve curability of photo-curable compositions, organophosphorus compounds are known to be used as photo-initiators for such compositions. As the organophosphorus compounds, for example, Patent Document 1 describes a monoacylalkylphosphine oxide represented by the following formula:

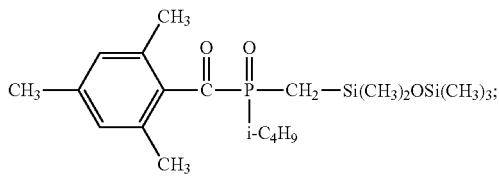

Patent Document 2 describes a monoacylarylphosphine oxide represented by the following formula:

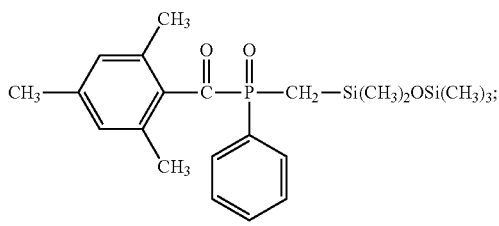

and Patent Document 3 describes a diacylarylphosphine oxide represented by the following formula:

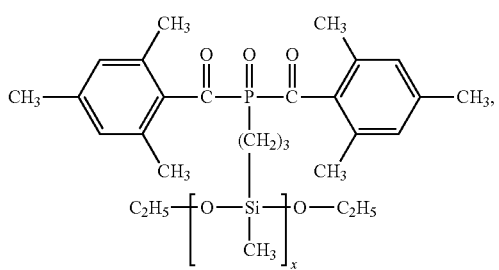

wherein "x" is a sufficient number for Mn=245,079.

However, in Patent Documents 1 to 3, an organosilicon compound having at least one acylphosphinate residue per molecule is not suggested.

PRIOR ART DOCUMENTS

Patent Documents

Patent Document 1: United States ("US") Patent Application Publication No. 2002/0026049 A1
Patent Document 2: US Patent Application Publication No. 2001/0031898 A1
Patent Document 3: US Patent Application Publication No. 2012/0142805 A1

BRIEF SUMMARY OF INVENTION

Technical Problem

An object of the present invention is to provide a novel organosilicon compound having at least one acylphosphinate residue per molecule, exhibiting excellent compatibility to organopolysiloxanes, and being useful as a photo-initiator for various types of photo-curable compositions.

Solution to Problem

The organosilicon compound of the present invention has not more than 200 silicon atoms per molecule, and is represented by the following average compositional formula (I):

$$Y_a R^1_b SiO_{(4-a-b)/2} \qquad (I)$$

wherein $R^1$ is an alkyl group having 1 to 12 carbon atoms, alkenyl group having 2 to 12 carbon atoms, aryl group having 6 to 20 carbon atoms, alkoxy group having 1 to 6 carbon atoms, or a hydroxyl group; Y is an acylphosphinate residue represented by the following general formula (II):

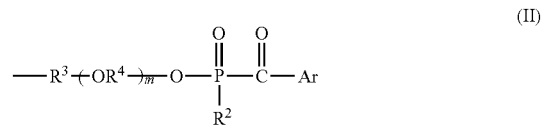

wherein $R^2$ is a non-substituted or halogen-substituted alkyl group having 1 to 12 carbon atoms, a non-substituted or halogen-substituted aryl group having 6 to 20 carbon atoms, an aralkyl group having 7 to 20 carbon atoms, or an alkoxy group having 1 to 6 carbon atoms; $R^3$ is a linear or branched alkylene group having 1 to 12 carbon atoms; $R^4$ is an alkylene group having 2 to 6 carbon atoms; Ar is a non-substituted, an alkoxy-substituted, or a halogen-substituted aryl group having 6 to 20 carbon atoms; and "m" is an integer of from 0 to 100; and "a" and "b" are numbers satisfying the following conditions: $0<a\leq 2$, $0<b\leq 3$, and $a\leq b$.

In various embodiments, $R^2$ is an aryl group having 6 to 20 carbon atoms.

In various embodiments, "m" is 0.

In various embodiments, "a" and "b" are numbers satisfying the following conditions: $a+b\leq 3$. In certain embodiments, "a" and "b" are numbers satisfying the following conditions: $1.5\leq a+b\leq 2.3$.

In various embodiments, the organosilicon compound of the present invention is an organosiloxane represented by the following general formula (III):

$$R^5_3SiO(R^5_2SiO)_nSiR^5_3 \quad (III)$$

wherein each $R^5$ is the same or different, $R^1$ and Y as described above, however, per molecule, at least one $R^5$ is Y as described above; and "n" is an integer of from 0 to 198.

In various embodiments, the organosilicon compound of the present invention is liquid at 25° C.

The method of the present invention for producing the organosilicon compound as described above, comprises the following steps:

i) reacting an organosilicon compound represented by the following average compositional formula (IV):

$$Z_a R^1_b SiO_{(4-a-b)/2} \quad (IV)$$

wherein $R^1$, "a" and "b" are as described above; and Z is a group represented by the following general formula (V):

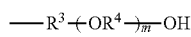

$$\quad (V)$$

wherein $R^3$, $R^4$ and "m" are as described above;

with an organophosphine compound represented by the following general formula (VI):

$$\quad (VI)$$

wherein $R^2$ is as described above; and X are the same or different halogen atoms, to obtain a reaction product; and then ii) reacting the reaction product with a carboxylic halide represented by the following general formula (VII):

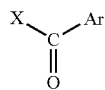

$$\quad (VII)$$

wherein X and Ar are as described above.

The photo initiator of the present invention comprises: the organosilicon compound as described above.

The photo-curable composition of the present invention comprises: the photo-initiator as described above.

Effects of Invention

The organosilicon compound of the present invention is a novel compound having at least one acylphosphinate residue per molecule, exhibits excellent compatibility to organopolysiloxanes, and is useful as a photo-initiator for a photo-curable silicone composition. Furthermore, the production method of the present invention can efficiently produce such a novel organopolysiloxane. Furthermore, the photo-initiator of the present invention exhibits excellent compatibility to organopolysiloxanes, and can cure various types of photo-curable compositions efficiently.

DETAILED DESCRIPTION OF THE INVENTION

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5% of the numerical values. Further, the term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

<Organosilicon Compound>

First, the organosilicon compound of the present invention will be described in detail.

The organosilicon compound of the present invention is represented by the following average compositional formula (I):

In the formula (I), $R^1$ is an alkyl group having 1 to 12 carbon atoms, alkenyl group having 2 to 12 carbon atoms, aryl group having 6 to 20 carbon atoms, alkoxy group having 1 to 6 carbon atoms, or a hydroxyl group.

Examples of the alkyl groups for $R^1$ include methyl groups, ethyl groups, propyl groups, butyl groups, pentyl groups, hexyl groups, heptyl groups, octyl groups, nonyl groups, decyl groups, undecyl groups, and dodecyl groups. In certain embodiments, at least one $R^1$ is a methyl group.

Examples of the alkenyl groups for $R^1$ include vinyl groups, allyl groups, isopropenyl groups, butenyl groups, pentenyl groups, hexenyl groups, cyclohexenyl groups, and octenyl groups. In certain embodiments, at least one $R^1$ is a vinyl group and/or at least one $R^1$ is an allyl group.

Examples of the aryl groups for $R^1$ include phenyl groups, tolyl groups, xylyl groups, and naphthyl groups. In certain embodiments, at least one $R^1$ is a phenyl group.

Examples of the alkoxy groups for $R^1$ include methoxy groups, ethoxy groups, propoxy groups, and butoxy groups. In certain embodiments, at least one $R^1$ is a methoxy group.

In the formula (I), Y is an acylphosphinate residue represented by the following general formula (II):

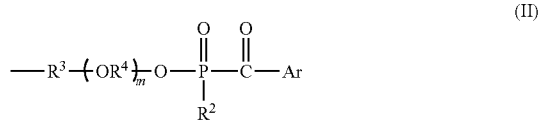

In the formula (II), $R^2$ is a non-substituted or a halogen-substituted alkyl group having 1 to 12 carbon atoms, a non-substituted or a halogen-substituted aryl group having 6 to 20 carbon atoms, an aralkyl group having 7 to 20 carbon atoms, or an alkoxy group having 1 to 6 carbon atoms.

Examples of the non-substituted or halogen-substituted alkyl groups for $R^2$ include methyl groups, ethyl groups, propyl groups, butyl groups, pentyl groups, hexyl groups, heptyl groups, octyl groups, nonyl groups, decyl groups, undecyl groups, dodecyl groups, 3-chloropropyl groups, and 3,3,3-trifluoropropyl groups. In certain embodiments, at least one $R^2$ is a methyl group.

Examples of the non-substituted or halogen-substituted aryl groups for $R^2$ include phenyl groups, tolyl groups, xylyl groups, mesityl groups, naphthyl groups, chlorophenyl groups, dichlorophenyl groups, and trichlorophenyl groups. In certain embodiments, at least one $R^2$ is a phenyl group.

Examples of the aralkyl groups for $R^2$ include benzyl groups, phenethyl groups, and phenylpropyl groups. In certain embodiments, at least one $R^2$ is a phenethyl group.

Examples of the alkoxy groups for $R^2$ include methoxy groups, ethoxy groups, propoxy groups, and butoxy groups. In certain embodiments, at least one $R^2$ is a methoxy group.

In the formula (II), $R^3$ is a linear or branched alkylene group having 1 to 12 carbon atoms. Examples of the alkylene groups for $R^3$ include methylene groups, 1,1-ethylene groups, 1,2-ethylene groups, 1,2-propylene groups, 1,3-propylene groups, and 1,4-butylene groups. In certain embodiments, at least one $R^3$ is a 1,3-propylene group.

In the formula (II), $R^4$ is an alkylene group having 2 to 6 carbon atoms. Examples of the alkylene groups for $R^4$ include 1,2-ethylene groups, 1,2-propylene groups, 1,3-propylene groups, and 1,4-butylene groups, and 1,2-ethylene groups. In certain embodiments, at least one $R^4$ is a 1,2-propylene group.

In the formula (II), Ar is a non-substituted, an alkoxy-substituted, or a halogen-substituted aryl group having 6 to 20 carbon atoms. Examples of the non-substituted, alkoxy-substituted, or halogen-substituted aryl groups for Ar include phenyl groups, tolyl groups, xylyl groups, mesityl groups, naphthyl groups, methoxyphenyl groups, dimethoxyphenyl groups, chlorophenyl groups, dichlorophenyl groups, and trichlorophenyl groups.

In the formula (II), "m" is an integer of from 0 to 100, optionally an integer of from 0 to 50, optionally an integer of from 0 to 10, or optionally an integer of from 0 to 5. This is because, when "m" is equal to or greater than the lower limit of the range described above, the molecular weight of the organosilicon compound can be increased, and volatility of the organosilicon compound can be reduced. On the other hand, when "m" is equal to or less than the upper limit of the range described above, curability of a photo-curable silicone composition comprising the organosilicon compound as a photo-initiator can be enhanced.

In the formula (II), "a" and "b" are numbers satisfying the following conditions: 0<a≤2, 0<b≤3, and a≤b, optionally "a" and "b" are numbers satisfying the following conditions: a+b 3, or optionally "a" and "b" are numbers satisfying the following conditions: 1.5≤a+b≤2.3. This is because, when "a" is equal to or greater than the lower limit of the range described above, curability of a photo-curable silicone composition comprising the organosilicon compound as a photo-initiator can be enhanced. On the other hand, when "a" is equal to or less than the upper limit of the range described above, compatibility of the organosilicon compound with organopolysiloxanes can be enhanced. While, when "b" is equal to or greater than the lower limit of the range described above, compatibility of the organosilicon compound with organopolysiloxanes can be enhanced. On the other hand, when "b" is equal to or less than the upper limit of the range described above, curability of a photo-curable silicone composition comprising the organosilicon compound as a photo-initiator can be enhanced.

The organosilicon compound has not more than 200 silicon atoms per molecule. In various embodiments, a number of silicon atoms per molecule is in a range of from 1 to 100, optionally in a range of from 5 to 50, optionally in a range of from 5 to 30, or optionally in a range of from 5 to 20. It is thought that when the number of silicon atoms is greater than or equal to the lower limit of the range described above, compatibility of the organosilicon compound with organopolysiloxanes can be enhanced. On the other hand, when it is equal to or less than the upper limit of the range described above, curability of a photo-curable silicone composition comprising the organosilicon compound as a photo-initiator can be enhanced.

In various embodiments, such organosilicon compound is an organosiloxane represented by the following general formula (III):

$$R^5{}_3SiO(R^5{}_2SiO)_n SiR^5{}_3 \quad (III)$$

In the formula (III), $R^5$ is the same or different, $R^1$ and/or Y as described above. However, per molecule, at least one $R^5$ is Y as described above.

In the formula (III), "n" is an integer of from 0 to 198, optionally an integer of from 0 to 98, optionally an integer of from 0 to 48, optionally an integer of from 0 to 28, or optionally an integer of from 0 to 18. This is because, when "n" is equal to or greater than the lower limit of the range described above, the molecular weight of the organosilicon compound can be increased, and volatility of the organosilicon compound can be reduced. On the other hand, when "n" is equal to or less than the upper limit of the range described above, curability of a photo-curable silicone composition comprising the organosilicon compound as a photo-initiator can be enhanced.

State of the organosilicon compound at 25° C. is not limited, but in various embodiments it is liquid.

<Method for Producing Organosilicon Compound>

Next, the method for producing the organosilicon compound of the present invention will be described in detail.

In step i), an organosilicon compound represented by the following compositional formula (IV):

$$Z_a R^1{}_b SiO_{(4-a-b)/2} \quad (IV)$$

is reacted with an organophosphine represented by the following general formula (VI):

(VI)

In the formula (IV), $R^1$, "a" and "b" are as described above.

In the formula (IV), Z is a group represented by the following general formula (V):

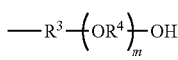

(V)

In the formula (V), $R^3$, $R^4$ and "m" are as described above.
In the formula (VI), $R^2$ is as described above.
In the formula (VI), X are the same or different halogen atoms. Examples of halogen atoms for X include fluorine atoms, chlorine atoms, bromine atoms and iodine atoms, and chlorine atoms. In certain embodiments, at least one X is a bromine atom.

In step i), the equivalent amount of the hydroxyl groups in the organosilicon compound (IV) described above should be reacted with the halogen atoms in the organophoshine compound (VI). In various embodiments, the reaction is performed in amounts where 0.5 mol to 2 mol, or optionally 0.75 mol to 1.5 mol, of the hydroxyl groups in the organosilicon compound (IV) is reacted with 1 mol of the halide group in the organophoshine compound (VI).

In step i), the reaction is carried out in the presence of a hydrogen halide acceptor. Examples of the hydrogen halide acceptors include tertiary amines such as trimethylamine, triethylamine, tri-n-propylamine, tri-n-butylamine, tri-i-butylamine, tri-n-hexylamine, tri-n-octylamine, triphenylamine, N,N-dimethylaniline, N,N-diethylaniline, dimethyl cyclohexylamine, diethyl cyclohexylamine, 1-methylpiperidine, and pyridine; secondary amines such as dimethylamine, diethylamine, and piperazine; primary amines such as butylamine and aniline; and inorganic salts such as sodium hydroxide, potassium hydroxide, and ammonia. In various embodiments, the reaction is carried out in the presence of at least one tertiary amine.

In step i), an organic solvent may be used in the preparation method described above. The utilized organic solvent is exemplified by ethers, aromatic or aliphatic hydrocarbons, and mixtures of two or more types of such solvents. In various embodiments, an organic solvent is utilized and selected from the group of hexane, heptane, octane, toluene, and xylene.

In step i), a reaction temperature is not limited, but in various embodiments it is in a range of from about room temperature to about 150° C. In step i), the reaction is promoted by the presence of a hydrogen halide acceptor. When an organic solvent is used, the reaction is generally performed at room temperature or lower but above freezing point of the organic solvent.

Next, in step ii), following the Arbuzov-Michaelis reaction, the reaction product obtained by step i) is reacted with a carboxylic halide represented by the following general formula (VII):

(VII)

In the formula (VII), X and Ar are as described above.

In step ii), the equivalent amount of the reaction product obtained by step i) described above should be reacted with the halogen atom in the carboxylic halide (VII). In various embodiments, the reaction is performed in amounts where 0.5 mol to 2 mol, or optionally 0.75 mol to 1.5 mol, of the reaction product obtained by step i) is reacted with 1 mol of the carboxylic halide (VII).

In step ii), an organic solvent may be used in the preparation method described above. The utilized organic solvent is exemplified by ethers, aromatic or aliphatic hydrocarbons, and mixtures of two or more types of such solvents. In various embodiments, an organic solvent is utilized and selected from the group of hexane, heptane, octane, toluene, and xylene.

In step ii), a reaction temperature is not limited, but in various embodiments it is in a range of from about room temperature to about 150° C. In step ii), the reaction is promoted by heating. When an organic solvent is used, the reaction is generally performed at the reflux temperature of the organic solvent.

The organosilicon compound of the present invention is useful as a photo initiator. So, the photo-initiator of the present invention comprises: the organosilicon compound as described above.

<Photo-Curable Composition>

In various embodiments, the photo-curable composition according to this disclosure is obtained by using the organosilicon compound described above as a photo-initiator. The photo-curable composition is not particularly limited, but is exemplified by acryl type photo-curable organic polymer compositions, thiol-ene type photo-curable silicone compositions, acryl type photo-curable silicone compositions, or the like. It is thought that such photo-curable silicone compositions have good to excellent curability due to good to excellent compatibility of the organosilicon compound as the photo-initiator, and/or good to excellent storage stability.

In various embodiments, the content of the photo-initiator is not limited, but in various embodiments it is in a range of from about 0.01 to about 5 mass %, optionally in a range of from about 0.05 to about 5 mass %, or optionally in a range of from about 0.05 to about 2 mass %, based on the photo-curable silicone composition. It is thought that when the content of the photo-initiator is greater than or equal to the lower limit of the range described above, curability of the resulting photo-curable silicone composition is improved, and when the content is less than or equal to the upper limit of the range described above, storage stability of the resulting photo-curable silicone composition is improved.

The photo-curable silicone composition further comprises a photo-initiator other than the organosilicon compound described above. Examples of such arbitrary photo-initiator include diphenyl(2,4,6-trimethylbenzoyl)phosphine oxide

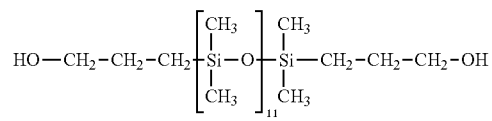

and 2.38 g of triethylamine and 20 ml of hexane were added while stirring. White precipitate was produced. The reaction mixture was stirred at room temperature for 30 min. As a result of $^1$H-NMR analysis, it was found that the 3-hydroxypropyl group-containing dimethylpolysiloxane was completely reacted. After filtering off the white precipitate, hexane was distilled at reduced pressure, then a colorless liquid was obtained.

The colorless liquid was loaded into a 250 ml Schlenk's flask with 70 ml of absolute toluene. 1.55 g of 2,4,6-trimethylbenzoyl chloride was added while stirring the mixture, and reacted at 80° C. under a $N_2$ flow for 12 hours. After confirming completion of the reaction by $^{31}$P-NMR analysis, the reaction mixture was washed by saturated sodium hydrocarbonate aqueous solution, dried over magnesium sulfate, then filtered. Low boiling point components were removed under reduced pressure to obtain 3.26 g of a light yellow liquid. As a result of $^1$H-NMR analysis, it was found that the liquid comprises:

an organosilicon compound represented by the following formula:

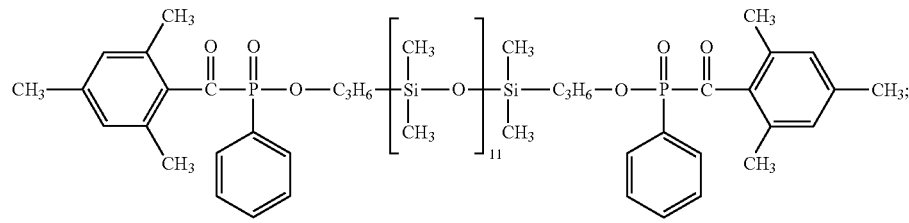

(trade name: Omnirad TPO, manufactured by IGM Resins B.V.), ethyl(2,4,6-trimethylbenzoyl)phenyl phosphonate (trade name: Omnirad TPO-L, manufactured by IGM Resins B.V.), and phenylbis(2,4,6-trimethylbenzoyl)phosphine oxide (trade name: Omnirad 819, manufactured by IGM Resins B.V.).

EXAMPLES

The organosilicon compound, the method for producing thereof, and the use of the present invention will be described in detail using Examples. Note that the viscosity at 25° C. was measured by means of a rotational viscometer VG-DA manufactured by Shibaura System Co., Ltd. Furthermore, in the formulas, "Me" represents a methyl group, and "Ph" represents a phenyl group.

Practical Example 1

In a reaction vessel under a $N_2$ atmosphere in glovebox, 1.56 g of dichlorophenylphosphine and 150 ml of hexane were placed, then 8.25 g of 3-hydroxypropyl group-containing dimethylpolysiloxane represented by the following formula:

an organosilicon compound represented by the following formula:

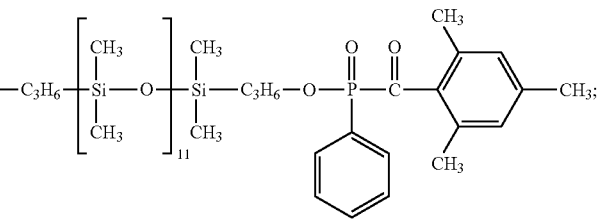

and
about 25 mol % of a dimethylpolysiloxane represented by the following formula:

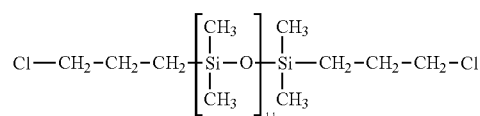

REFERENCE EXAMPLES 1 AND 2

Silicone compositions shown in Table 1 were prepared using the components described below.

The following component was used as component (A).
A dimethylpolysiloxane end-capped with dimethylvinylsiloxy groups at both molecular terminals, and having a viscosity of 10,000 mPa·s.
The following components were used as component (B).
Component (b-1): the organosilicon compound prepared in Example 1
Component (b-2): a phosphine compound represented by the following formula:

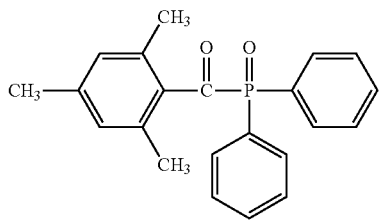

<Transmittance of Silicone Compositions>
Transmittance of the silicone compositions in an acrylic cell having a light pass length of 1 cm were measured by a transmittance measurement (UV-1650 PC manufactured by Shimadzu Corp.).

TABLE 1

| Item | | Category | |
|---|---|---|---|
| | | Reference Example 1 | Reference Example 2 |
| Silicone composition (parts by mass) | (A) | 9.90 | 9.98 |
| | (B) (b-1) | 0.10 | — |
| | (b-2) | — | 0.02 |
| Transmittance (%) | | 88 | 18 |

Practical Examples 2 to 5 and Comparative Example 1

Photo-curable compositions shown in Table 2 were prepared using the components described below.
The following components were used as component (A).
Component (a-1): an acryl compound represented by the following formula:

$CH_2{=}CHC(O)O{-}(C_2H_4O)_2{-}CH_2CH(C_2H_5)C_4H_9$

Component (a-2): an acryl compound represented by the following formula:

$CH_2{=}CHC(O)O{-}(C_2H_4O)_4{-}C_6H_5$

Component (a-3): trimethylol propane triacrylate
Component (a-4): a dimethylpolysiloxane end-capped with dimethylvinylsiloxy groups at both molecular terminals, and having a viscosity of 2,000 mPa·s.
Component (a-5): a dimethylsiloxane·methyl(3-mercaptopropyl)siloxane copolymer end-capped with trimethylsiloxy groups at both molecular terminals, and having a viscosity of 100 mPa·s.
The following components were used as component (B).
Component (b-1): the organosilicon compound prepared in Example 1
Component (b-2): a phosphine compound represented by the following formula:

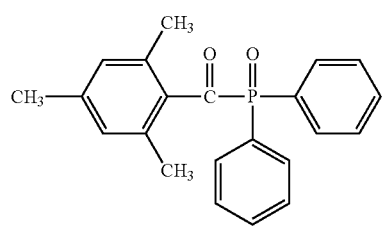 [SMILES: Cc1cc(C)c(C(=O)P(=O)(c2ccccc2)c2ccccc2)c(C)c1]

<Curing of Photo-Curable Compositions>
Into a glass vessel had a depth of 15 mm and an inner diameter of 30 mm, a photo-curable composition was filled. Then, ultraviolet light was irradiated using a LED lamp with 405 nm of 50 mW/cm² for 20 seconds to form a cured product.
<Hardness of Cured Product>
The Shore A hardness of the obtained cured product was measured using type A durometer as measured in accordance with ASTM D2240. The needle penetration of the obtained cured product was measured using a needle penetration tester equipped with ¼ cone accordance with JIS K 2220.
<Appearance of Photo-Curable Composition and Cured Product>
The photo-curable compositions and cured products were observed by visual inspection.

TABLE 2

| Item | | | Category | | |
|---|---|---|---|---|---|
| | | | Prac. Example 2 | Prac. Example 3 | Prac. Example 4 |
| Composition of photo-curable composition (parts by mass) | (A) | (a-1) | 9.95 | 9.50 | — |
| | | (a-2) | — | — | 9.50 |
| | | (a-3) | — | 0.45 | 0.45 |
| | | (a-4) | — | — | — |
| | | (a-5) | — | — | — |
| | (B) | (b-1) | 0.05 | 0.05 | 0.05 |
| | | (b-2) | — | — | — |
| Appearance | | | Transparent | Transparent | Translucent |
| Cured Product | Appearance | | Transparent | Transparent | Translucent |
| | Penetration | | >80 | 8 | <5 |
| | Shore A Hardness | | — | — | <10 |

TABLE 2-continued

|  |  |  | Category | |
|---|---|---|---|---|
|  | Item |  | Prac. Example 5 | Comp. Example 1 |
| Composition of photo-curable composition (parts by mass) | (A) | (a-1) | — | — |
|  |  | (a-2) | — | — |
|  |  | (a-3) | — | — |
|  |  | (a-4) | 9.56 | 9.59 |
|  |  | (a-5) | 0.39 | 0.39 |
|  | (B) | (b-1) | 0.05 | — |
|  |  | (b-2) | — | 0.02 |
| Appearance Cured Product | Appearance |  | Transparent Transparent | Milky-white did not cure |
|  | Penetration |  | 23 | — |
|  | Shore A Hardness |  | — | — |

INDUSTRIAL APPLICABILITY

Since the organosilicon compound of the present invention exhibits excellent compatibility to organopolysiloxanes, it can be used as a photo-initiator for various types of photo-curable compositions. The photo-curable composition obtained in this manner may be used as an adhesive, potting agent, protective coating agent, or underfill agent for various types of substrates.

What is claimed is:

1. A method for producing an organosilicon compound having not more than 200 silicon atoms per molecule, and represented by the following average compositional formula (I):

$$Y_a R^1_b SiO_{(4-a-b)/2} \quad (I)$$

wherein $R^1$ is an alkyl group having 1 to 12 carbon atoms, alkenyl group having 2 to 12 carbon atoms, aryl group having 6 to 20 carbon atoms, alkoxy group having 1 to 6 carbon atoms, or a hydroxyl group; Y is an acylphosphinate residue represented by the following general formula (II):

(II)

wherein $R^2$ is a non-substituted or halogen-substituted alkyl group having 1 to 12 carbon atoms, a non-substituted or halogen-substituted aryl group having 6 to 20 carbon atoms, an aralkyl group having 7 to 20 carbon atoms, or an alkoxy group having 1 to 6 carbon atoms; $R^3$ is a linear or branched alkylene group having 1 to 12 carbon atoms; $R^4$ is an alkylene group having 2 to 6 carbon atoms; Ar is a non-substituted, an alkoxy-substituted, or a halogen-substituted aryl group having 6 to 20 carbon atoms; and subscript m is an integer of from 0 to 100; and subscripts a and b are numbers satisfying the following conditions: $0<a\leq 2$, $0<b\leq 3$, and $a\leq b$; the method comprising the following steps:

i) reacting an organosilicon compound represented by the following average compositional formula (IV):

$$Z_a R^1_b SiO_{(4-a-b)/2} \quad (IV)$$

wherein $R^1$ and subscripts a and b are each as described above; and Z is a group represented by the following general formula (V):

 (V)

wherein $R^3$, $R^4$ and subscript m are each as described above; with an organophosphine compound represented by the following general formula (VI):

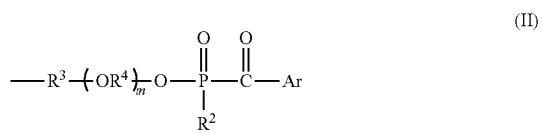 (VI)

wherein $R^2$ is as described above; and X are the same or different halogen atoms, to obtain a reaction product; and then ii) reacting the reaction product of step i) with a carboxylic halide represented by the following general formula (VII):

 (VII)

wherein X and Ar are each as described above.

2. The method according to claim 1, wherein $R^2$ is an aryl group having 6 to 20 carbon atoms.

3. The method according to claim 1, wherein subscript m is 0.

4. The method according to claim 1, wherein subscripts a and b are numbers satisfying the following condition: $a+b\leq 3$.

5. The method according to claim 1, wherein subscripts a and b are numbers satisfying the following condition: $1.5\leq a+b\leq 2.3$.

6. The method according to claim 1, wherein the organosilicon compound is an organosiloxane represented by the following general formula (III):

$$R^5_3SiO(R^5_2SiO)_n SiR^5_3 \quad (III)$$

wherein each $R^5$ is independently $R^1$ or Y as described above, provided at least one $R^5$ per molecule is Y; and subscript n is an integer of from 0 to 198.

7. The method according to claim 1, wherein the organosilicon compound is liquid at 25° C.

* * * * *